3,256,136
CERAMIC MATERIAL

Leland G. Cole, Fullerton, Calif., and Ralph L. Cook, Champaign, Ill., assignors to Consolidated Electrodynamics Corporation, Pasadena, Calif., a corporation of California
No Drawing. Filed May 11, 1961, Ser. No. 109,261
6 Claims. (Cl. 161—193)

This invention relates to a ceramic material and particularly to a high-temperature radiation-resistant ceramic insulating material.

Ceramic insulating materials, capable of providing bonds with metals, are required in various applications and, particularly, in electronic instrumentation. In association with, or as a part of, electronic instrumentation, ceramic insulating materials are utilized in the formation of electrode seals which, in many uses, must be able to withstand high temperatures as well as severe physical and thermal shocks. An electrode seal is the combination of an electrically-conductive pin or electrode and an electrically-insulating material through which the electrode passes to provide an electrical connection between components within a housing or envelope and other components of the system external of the housing. In order to isolate the interior of the housing or envelope, as is required in many applications, the insulating material must provide a gas-tight seal with the base in which it is inserted.

The operating requirements for seals has led to the development of ceramic materials which exhibit unusual electrical and bonding characteristics for use as insulating materials. Such ceramic materials include compositions which, while possibly including other metallic oxides, are basically ternary systems consisting of the oxides of lead, boron, and silicon, and the oxides of aluminum, boron, and silicon. The presence of boron in these ternary systems, however, prevents utilization of these ceramic materials in electronic instrumentation subjected to strong radiation fields. This is because boron has a high capture cross section for neutrons, and absorption of neutrons results in a deterioration of the boron atom. As a result, in ceramic materials including boron, neutron radiation produces internal stresses in the material which can cause cracking and can affect the insulation resistance of the material.

The present invention is a ceramic insulating material from which boron has been eliminated. The ceramic material of the present invention includes bismuth in place of boron, the proportions of bismuth and the other metallic oxides of the composition of the ceramic material being such that devitrification difficulties are avoided, and high thermal stability and high electrical resistivity are obtained. Furthermore, since the capture cross section of bismuth is only 0.016 barn, as compared to the capture cross section of 700 barns for boron, the ceramic insulating material of the present invention has a low capture cross section and may be subjected to nuclear radiation fields without significant deteriorative effects.

The high-temperature radiation-resistant ceramic insulating material of the present invention has a composition which by weight consists essentially of from 5% to 30% bismuth oxide, from 15% to 35% silicon dioxide, and from 25% to 45% of an oxide of a metal selected from the group consisting of lead and aluminum. In a presently preferred form, the ceramic insulating material of the present invention has a composition which by weight consists essentially of from 5% to 30% bismuth oxide, from 25% to 45% lead oxide, from 15% to 35% silicon dioxide, and from 0.5% to 2.5% aluminum oxide. A specific ceramic insulating material of the presently preferred form has a composition which by weight consists essentially of about 42% lead oxide, about 30% bismuth oxide, about 26% silicon dioxide, and about 2% aluminum oxide.

The ingredients of the ceramic insulating material of the present invention set forth above constitute the basic formulation for obtaining a high-temperature radiation-resistant ceramic insulating material. However, without affecting these fundamental characteristics, other metallic oxides may be added to the basic formulation for the purpose of advantageously modifying some characteristics of the material. For example, the following amounts of one or more of the ingredients enumerated below may be added to the basic formulation in the proportions set forth:

| Additive: | Percent by weight |
|---|---|
| Barium oxide | 0–15 |
| Cobalt oxide | 0–2.5 |
| Lithium oxide | 0–2.5 |
| Nickel oxide | 0–2.5 |
| Chromium oxide | 0–5 |
| Iron oxide | 0–2.5 |
| Manganese oxide | 0–5 |
| Potassium oxide | 0–5 |

A specific formulation of the ceramic insulating material, having advantageous characteristics as a high-temperature radiation-resistant ceramic insulating material for hermetic seals in electronic instrumentation, includes both barium oxide and cobalt oxide of the foregoing materials. This specific formulation has the following composition:

| | Percent by weight |
|---|---|
| Lead oxide (PbO) | 35.70 |
| Bismuth oxide ($Bi_2O_3$) | 25.30 |
| Silicon dioxide ($SiO_2$) | 22.35 |
| Barium oxide (BaO) | 13.05 |
| Cobalt oxide (CoO) | 1.97 |
| Aluminum oxide ($Al_2O_3$) | 1.63 |

A description of the manner in which the specific formulation set forth above was prepared, will serve to illustrate the manner of preparation of the ceramic material of the present invention. An initial mixture was compounded from the following ingredients:

| Ingredient: | Percent by weight |
|---|---|
| Red lead | 32.54 |
| Barium carbonate | 14.91 |
| Bismuth sub-nitrate | 29.35 |
| Silica | 19.85 |
| Cobalt oxide | 1.88 |
| Alumina | 1.47 |

The above-enumerated raw materials were initially screened and intimately blended by grinding in a ball mill in the dry state. The mixture was then placed in a refractory crucible and heated at a temperature of about 2050° F. for about two hours, until a uniform homogeneous glass was obtained. It has been found that a melting temperature in the range from 1900° to 2150° F. may be used. After complete melting, the glass was quenched in water at room temperature and the resulting frit was then ground in a ball mill to obtain a fine powder ready for use in the preparation of hermetic seals and other insulating components.

The characteristics of high thermal stability and high electrical resistivity, coupled with radiation resistance, found in the ceramic materials described herein, makes these ceramic materials utilizable in a variety of severe environments without significant deteriorative effects.

We claim:
1. In electrode seals in which a ceramic material is bonded to an electrically conductive metallic electrode, the improvement wherein the ceramic material is a high-temperature radiation-resistant boron-free glass insulating material which by weight consists essentially of from 5% to 30% bismuth oxide, from 15% to 35% silicon dioxide, and from 25% to 45% lead oxide.

2. In electrode seals in which a ceramic material is bonded to an electrically conductive metallic electrode, an improvement wherein the ceramic material is a high-temperature radiation-resistant boron-free glass insulating material which by weight consists essentially of from 5% to 30% bismuth oxide, from 25% to 45% lead oxide, from 15% to 35% silicon dioxide, and from 0.5% to 2.5% aluminum oxide.

3. In electrode seals in which a ceramic material is bonded to an electrically conductive metallic electrode, an improvement wherein the ceramic material is a high-temperature radiation-resistant boron-free glass insulating material which by weight consists essentially of about 42% lead oxide, about 30% bismuth oxide, about 26% silicon dioxide, and about 2% aluminum oxide.

4. In electrode seals in which a ceramic material is bonded to an electrically conductive metallic electrode, an improvement wherein the ceramic material is a high-temperature radiation-resistant boron-free glass insulating material which by weight consists essentially of from 5% to 30% bismuth oxide, from 25% to 45% lead oxide, from 15% to 35% silicon dioxide, from 0.5% to 2.5% aluminum oxide, and barium oxide in an amount not exceeding 15% by weight.

5. In which a ceramic material is bonded to an electrically conductive metallic electrode, an improvement wherein the ceramic material is a high-temperature radiation-resistant boron-free glass insulating material which by weight consists essentially of about 36% lead oxide, about 26% bismuth oxide, about 23% silicon dioxide, about 13% barium oxide, and about 2% aluminum oxide.

6. In electrode seals in which a ceramic material is bonded to an electrically conductive metallic electrode, an improvement wherein the ceramic material is a high-temperature radiation-resistant boron-free glass insulating material which by weight consists essentially of about 36% lead oxide, about 25% bismuth oxide, about 22% silicon dioxide, about 13% barium oxide, about 2% aluminum oxide, and about 2% cobalt oxide.

References Cited by the Examiner

UNITED STATES PATENTS

| | | | |
|---|---|---|---|
| 2,588,920 | 3/1952 | Green | 106—49 |
| 2,911,312 | 11/1959 | Hoffman | 106—49 |
| 3,106,490 | 10/1963 | Earl | 106—49 |

TOBIAS E. LEVOW, *Primary Examiner.*

JOSEPH REBOLD, *Examiner.*

D. ARNOLD, H. McCARTHY, *Assistant Examiners.*